(No Model.)
M. D. MAIN.
MILK COOLER.
No. 467,876. Patented Jan. 26, 1892.
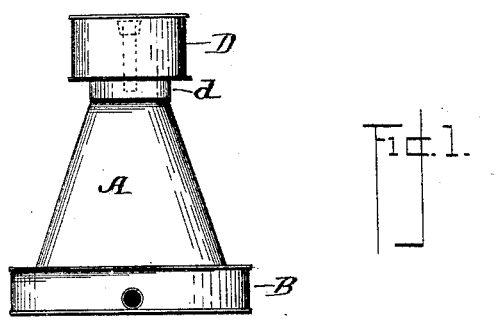
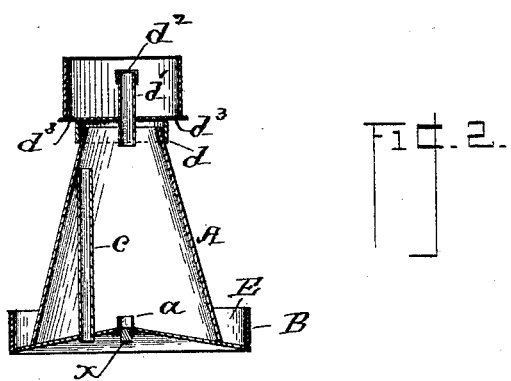
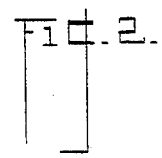
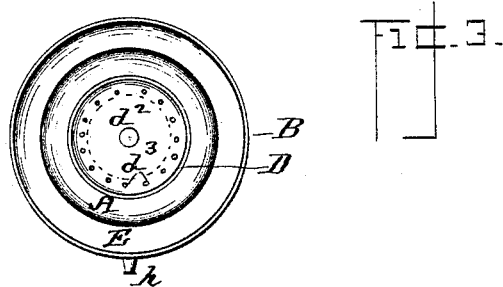
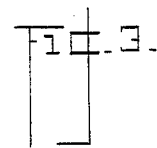
Witnesses.
Jas. G. Faster
J. C. Haviland
Inventor
Marvin D. Main
by J. R. Nottingham
atty.

UNITED STATES PATENT OFFICE.

MARVIN D. MAIN, OF CORTLAND, NEW YORK, ASSIGNOR OF ONE-HALF TO ELIAS B. GLEN, OF SAME PLACE.

MILK-COOLER.

SPECIFICATION forming part of Letters Patent No. 467,876, dated January 26, 1892.

Application filed June 29, 1891. Serial No. 397,851. (No model.)

*To all whom it may concern:*

Be it known that I, MARVIN D. MAIN, a citizen of the United States, residing at Cortland, in the county of Cortland and State of New York, have invented certain new and useful Improvements in Milk-Coolers; and I do hereby declare the following to be a full, clear, and exact description of the invention, such as will enable others skilled in the art to which it appertains to make and use the same.

My invention relates to certain improvements in liquid-cooling apparatus in which the liquid is first caused to flow in a thin sheet through the open air, and then upon a cooled surface, down into a proper receptacle, the object being, principally, to aerate, deodorize, and cool fresh warm milk by expelling therefrom the animal odors and heat. This object is attained by the apparatus illustrated in the accompanying drawings, in which—

Figure 1 represents an elevation of my improved device; Fig. 2, a vertical section, and Fig. 3 a top plan view, of the same.

A indicates a hollow truncated cone, which serves as a refrigerating-chamber and is set in a pan B, somewhat larger than the base of the cone. The center of the pan is provided with an opening in which is fitted a short inlet-pipe $a$, and to one side thereof is located an overflow-pipe $c$, which extends to within a short distance of the top of the cone.

Located on the top of the cone-chamber is a removable milk-reservoir D, the bottom of which forms a cover to the cone-chamber, the flange $d$ fitting over the top thereof. The milk-reservoir is provided with a central outlet-pipe $d'$, having a removable cover $d^2$, and its bottom with a circular row or rows of small perforations $d^3$, the diameter of which row or rows is somewhat greater than that of the cone at the top.

The operation of the device is as follows: As the milk is poured into the reservoir D, it flows through the perforations $d^3$ in a thin sheet into the open air some distance before it comes in contact with the cooled outer surface of the cone-chamber, which has been previously filled with ice, ice-water, or other refrigerating substance. While thus exposed to the open air the milk becomes aerated and deodorized. After passing through the open air it comes in contact with the cooled outer surface of the cone-chamber, down which surface it flows until it reaches the circular channel E, formed by the side of the cone and the side of the pan. From thence it passes through the outlet $h$ into a proper receptacle or receiving-vessel. (Not shown.) While flowing down the surface of the cone-chamber the milk is still subject to the influence of the air upon one side, and when it reaches the channel E it is freed of all impurities and cooled to any desired temperature, according to the character of the refrigerant used. If water at a temperature of, say, 45° Fahrenheit be used, milk fresh from the cow will be cooled to a temperature of about 60°, and if ice be used the milk can be reduced to a temperature of about 45°, fresh warm milk being about 90°.

It will be observed that my apparatus is well adapted to the use of almost any of the well-known means of refrigeration.

Ordinarily running water as a cooling medium produces satisfactory results. The water is introduced at the inlet-pipe $a$, filling the cone-chamber until it reaches the top of the overflow-pipe, when it is conducted through said pipe to the outside, thus establishing a complete water-circulation, the degree of coldness, to some extent, being regulated by means of the removable cover $d^2$, the removal of which will allow the heated air above the water to escape through the pipe $d'$ and be replaced by cooler air, thus increasing somewhat the cooling properties of the water, or if ice or ice-water be used, the inlet-pipe is closed by a suitable stopper $x$, and the degree of coldness regulated in the same manner.

My apparatus is specially adapted to air-circulation, and good results will be obtained at that season of the year when the temperature is sufficiently cold to dispense with some of the aforementioned cooling mediums. In fact one of the principal features of my invention is the ready adaptation of the apparatus from one cooling medium to another. By removing the stopper from the inlet-pipe $a$ and the cover from the outlet-pipe $d'$ a circulation of air is at once established through the cone-chamber, the overflow-pipe aiding in the operation. The air being taken in at the bottom of the cone-chamber, fills the same and rushes out through the outlet-pipe $d'$. As the air in the upper part of the cone-chamber becomes heated from the milk, it is forced out and replaced by the cold air coming in at the bottom, the operation of forcing out and replacing being greatly aided by the rush of air through the overflow-pipe. Should the air in the cone-chamber become too cold for the desired temperature of the milk, the cover $d^2$ is replaced on the pipe $d'$, when the air will become warmer and the desired temperature be obtained.

Having thus fully described my invention, what I claim as new, and desire to secure by Letters Patent, is—

1. In a milk-cooler, the combination, with an open-top truncated-cone refrigerating-chamber provided with an inlet-pipe, of a reservoir adapted to fit over the open-top refrigerating-chamber and provided with a ventilating-tube opening into said refrigerating-chamber and with a circular row of perforations arranged to deliver the milk at a point some distance below the top of the cone-chamber, substantially as specified.

2. In a milk-cooler, the combination, with an open-top truncated-cone refrigerating-chamber having its base formed with a circular milk-channel and provided with an inlet-pipe and an overflow-pipe, of a reservoir having a flange adapted to encircle the open-top truncated cone and provided with a ventilating-tube to permit the escape of the heated air from the refrigerating-chamber and with a circular row of perforations arranged in the bottom of said reservoir outside of the flange and adapted to deliver the milk at a point some distance below the top of the truncated-cone chamber, substantially as specified.

In testimony whereof I affix my signature in the presence of two witnesses.

MARVIN D. MAIN.

Witnesses:
JOHN W. SUGGETT,
WM. KENNEDY.